March 5, 1968   E. MATOVICH   3,371,978
PRESSURE-SENSITIVE OPTICAL CELL
Filed Feb. 12, 1964   2 Sheets-Sheet 2

INVENTOR.
EDWIN MATOVICH
BY Sidney Magnes
AGENT

United States Patent Office 3,371,978
Patented Mar. 5, 1968

3,371,978
PRESSURE-SENSITIVE OPTICAL CELL
Edwin Matovich, Costa Mesa, Calif., assignor to
North American Aviation, Inc.
Filed Feb. 12, 1964, Ser. No. 344,292
5 Claims. (Cl. 350—160)

ABSTRACT OF THE DISCLOSURE

A transparent housing contains a compressible liquid, the index of refraction of which varies as a function of pressure. Immersed in the liquid are a plurality of particles of transparent incompressible material. When appropriate pressure is applied to the fluid, its index of refraction changes to match that of the material, thereby permitting transmission of light through the cell. When such matched index condition does not exist, incident light is scattered by the interfaces between the particles and the liquid.

---

The invention relates to an optical device; and more particularly to an optical cell that can be used as an optical filter, as an optical shutter, as an optical scanner, and as other devices that perform optical functions.

There is an ever-increasing need for optical "filters," that is for devices that transmit only a limited spectrum of colors; or, stated in another way, devices that filter-out unwanted colors.

It is well known that in using a camera, an optical filter may be superposed onto the photographic lens in order to enhance the resultant photograph; the optical filter achieving this result by permitting only selected colors to impinge upon the film in the camera. In the above case, the optical filters are usually satisfactory if they transmit—or filter-out—a range of colors; such as the blues, the yellows, the reds, the greens, etc.

In many applications, however, it is desirable to transmit not a range of colors but to transmit only a particular shade of a selected color, such as a selected shade of red, for example. In fact, many specialized applications require that only the invisible-to-the-eye "colors" such as ultra-violet or infra-red be transmitted.

Optical filters that transmit only an extremely limited range of colors are known as "narrow-band-pass" filters, since they transmit only a narrow band of colors and reject or attenuate all others.

The most widely used optical filters are sheets of glass that have been colored to provide the desired color-transmitting and color-filtering characteristics. Unfortunately, however, these glass optical filters transmit a fairly wide range of color; and therefore are not completely satisfactory in many specialized applications.

Another type of widely-used optical device is the optical "shutter." Generally speaking, optical shutters operate in such a manner that they either transmit or block the transmission of light for a finite interval of time.

Many present-day devices require shutters whose transmission interval, or blocking interval, is measured in millionths of a second. As may be understood, most mechanical devices cannot be made to operate satisfactorily at these speeds; and other approaches have been sought. Unfortunately, however, the other approaches have generally resulted in optical shutters that are complex, bulky, and unreliable.

Still another useful optical device is the "scanner"; an arrangement that causes a beam of light to move from one position to another. In the past, optical scanning has generally been performed by shining a beam of light onto a mirror, and causing the mirror to twist or move; the mirror's movement reflecting the beam of light in such a way that a spot of light moves, or "scans," from one position to another.

In some cases the mirror takes the form of a multi-sided prism having its faces polished and mirrored; so that rotation of the prism causes sequential faces of the prism to reflect a beam of light to cyclically scan in a predetermined manner.

As may be realized, these mechanical arrangements tend to be noisy and subject to wear, as to be less than completely satisfactory.

It is therefore the principal object of the invention to provide an improved high-speed optical device, free of the defects of the mechanical devices of the prior art.

The attainment of this object and others will be realized from the following specification, taken in conjunction with the drawings of which:

FIGURE 1 illustrates the manner in which a material's "index of refraction" changes with wavelength;

FIGURE 2 illustrates the basic inventive concept used as an optical filter and as an optical shutter;

Figure 3:
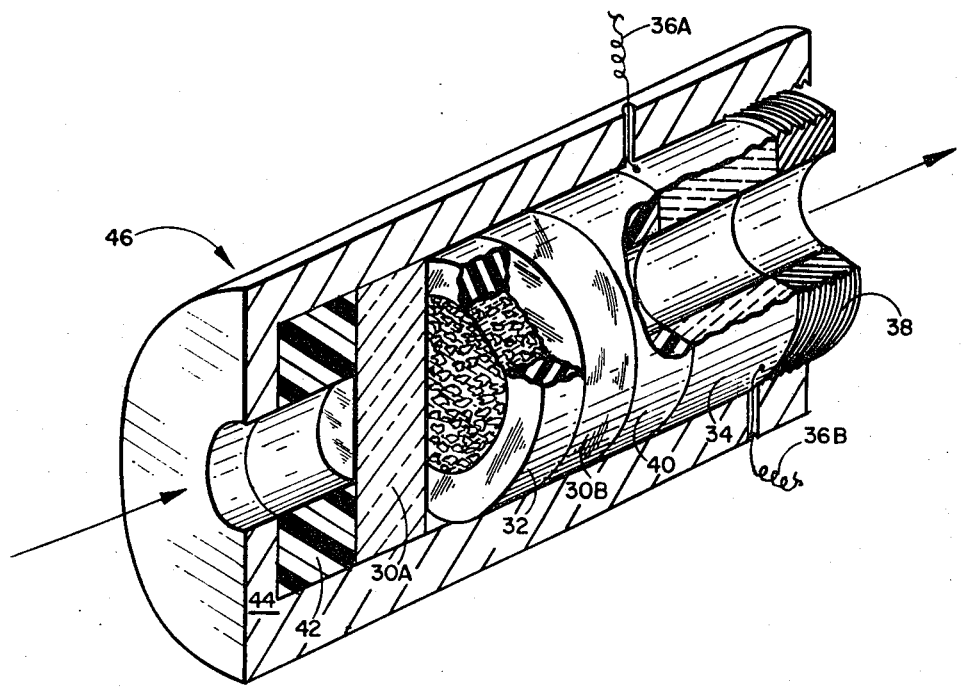
FIGURE 3 illustrates another arrangement for practicing the invention.

The present invention contemplates an optical cell that contains a transparent compressible liquid. Pressurizing the liquid changes its index of refraction, thus changing its light-transmitting characteristics.

The present inventive concept contemplates an optical cell that comprises particles of a transparent incompressible solid immersed in a transparent compressible liquid. Ordinarily, when light is passed through this combination, the light is scattered in such a manner that practically no light emerges from the optical cell; so that the optical cell is practically opaque. In accordance with the present invention, the steady state pressure of the compressible liquid is changed so that its index of refraction is changed to substantially that of the transparent solid particles. Under this steady-state condition, the optical cell becomes transparent; whereupon light will pass through the entire optical cell, and will emerge at the distant side thereof.

Alternatively, the optical cell may be quiescently transparent; and may become opaque when suitably pressurized.

The present inventive concept also contemplates a liquid-filled, prism-like optical cell that ordinarily causes light to be bent through an angle that is determined—in part—by the index of refraction of the liquid. In accordance with the present invention, the liquid is pressurized in a steady-state manner, so that its index of refraction changes to cause the light to be bent through a different angle. By progressively changing the pressure, the angle of the emergent light may be progressively changed.

It is known that if a transparent object, such as a piece of glass, is immersed in a water-filled container, the glass object is visible. This visibility is caused by the fact that the index of refraction of the glass is different from the index of refraction of the water; so that there is an optical "interface" at the water-glass junction, this interface causing an interference with the passage of the light.

If, however, the glass object were immersed in a liquid that had the same index of refraction as the glass object, the glass object would not be visible. The loss of visibility is due to the fact that the index of refraction of the glass object would now be the same as the index of refraction of the liquid; and there would not be any optical interface at the liquid-glass junction.

In the interests of simplicity, the present invention will first be described in terms of "monochromatic" light; that is light having a single color. This simplification will be used because, for monochromatic light, each material has a single finite value for its index of refraction.

FIGURE 1 shows a graph that plots the index of refraction against wavelength (color) of light.

For most transparent solids—such as glass, quartz, etc.—the index of refraction is practically the same for all colors (wavelengths), as shown by the straight solid-line 10.

For most transparent liquids, however, the index of refraction changes appreciably for different colors (wavelengths), as shown by the curved solid-line 12.

Since lines 10 and 12 cross (point 13 in FIGURE 1), the liquid and the solid exemplified in FIGURE 1 would have the same index of refraction for a given wavelength L; and there would not be any light-reflecting optical interface at such wavelength. Therefore, for colored light having this particular wavelength, L, a piece of this particular material would be invisible when immersed in this particular liquid.

Stated in another way, if monochromatic light of wavelength L were directed through an optical cell comprising this material and this liquid, the light would find the optical cell transparent; and it would be transmitted therethrough, emerging from the distant side of the optical cell.

For light of a wavelength other than L, the material and the liquid would each have a different index of refraction. This condition would produce optical-interfaces that would cause the light to be scattered, so that only a limited amount—if any—of the light would pass thru the optical cell.

It will be realized that by selecting particular transparent solids and liquids, their corresponding lines 10 and 12 would cross at other wavelengths, and at different angles. Thus, by using selected combinations of materials, an optical cell can be produced to transmit specific wavelengths, or colors of light, the practical band width of which tends to vary immensely with the crossing angle θ of lines 10 and 12 (in FIGURE 1).

It has been found that if the liquid is pressurized, its index-wavelength line will move from the solid-line representation 12 (in FIGURE 1) to a dashed-line representation such as 12A—which crosses the line 10 at a different point 13A. The new crossing-point indicates that the pressurized liquid and the transparent solid have the same index of refraction for a color of light having a wavelength L'. The optical cell will no longer be transparent to the color of light corresponding to original wavelength L; but will now be transparent to the color of light corresponding to the new wavelength L'.

Thus it is possible—by pressurizing the liquid—to change the wavelength at which the optical cell is transparent. In other words, a narrow band pass optical filter is provided, the pass band of which has an adjustable center wavelength or center frequency.

The above concept can be expanded by having the pressure-sensitive optical cell normally partly pressurized. Under this condition, the quiescent operation would be along line 12 of FIGURE 1. Additional pressure would move the operation to line 12A; and reduction of the pressure would move the operation to line 12B, resulting in the transmission of light of a third wavelength L".

If polychromatic light—rather than monochromatic light—is used, the optical cell will transmit only a specific color, the particular color depending upon the combination of liquid, solid, and applied pressure.

A pressure-sensitive optical cell for achieving the above results is shown schematically in FIGURE 2. This illustration shows a container 14 that has been filled with particles 16 of a crushed transparent solid material, such as glass which has an index of refraction of about 1.46 for yellow light. A liquid, 18, such as diacetylacetone—which has an index of refraction of about 1.45 for yellow light—has been poured into container 14 until the container has been completely filled. A flexible cover 20 is then placed over container 14; cover 20 being of a resilient material such as rubber, stainless steel, or the like.

If yellow light is now directed into the light-input face of the optical cell, as indicated by arrows 22, the light will be scattered from each interface between the particles 16 and the liquid 18, in the manner previously described, because the index of refraction is different for the particle and for the liquid. As a result, the incoming light will be reflected in various directions, so that practically no light will emerge from the optical cell.

If now a plunger 24 presses upon cover 20, and causes it to bend inward under the pressure of the plunger, cover 20 will apply a steady, constant pressure to liquid 18; and will therefore pressurize the optical cell. As previously explained, in its pressurized condition, liquid 18 changes its index of refraction; and suitable pressure will cause every portion of the liquid to assume the same index of refraction that is equal to the index of refraction of the particles. Under this steady-state condition there is no optical interface between the particles and the liquid, since the indices of refraction are the same; and therefore the impinging light shown by arrows 22 passes through the now-transparent optical cell, and emerges at the light-output face of the optical cell, as indicated by arrows 26.

If container 14 is made of the same material as the particles 16, and if the liquid is properly pressurized, then every part of the optical cell (namely, the container, all portions of the liquid, and the glass particles) all have the same index of refraction. Under these conditions there are no optical interfaces; and the entire optical cell acts as a single optical unit.

Alternatively, the container may be made of a different transparent material—such as quartz—if a higher strength material is necessary to withstand the pressure. Under this condition there may be an optical interface between the inner surface of the container and abutting surfaces of the particles and/or the liquid; and the operation of the optical cell will be slightly less efficient.

The above concept permits a pressure-sensitive optical cell to perform two functions. The first is to change its light-filtering characteristics; and the second is to act as a light-shutter.

The pressure may be applied in steps, as by a step-cam arrangement, which may be desirable for the shutter function; or it may be applied in a continuously variable manner, as by a screw arrangement, which may be desirable for the light-filtering function.

The previously described glass-diacetylacetone optical cell operates best for yellow light; but other liquids and particles may be used for different colors.

For example, for infra-red radiations quartz has an index of refraction of 1.45, while liquid benzene has an index of refraction of 1.43. A suitably pressurized optical cell having these two materials would be transparent to infra-red radiations.

If alcohol—with an index of refraction of 1.37 for ultra-violet radiations—were used with quartz particles—having an index of refraction of 1.47 for ultra-violet—the pressurized optical cell would then be transparent to ultra-violet radiations.

Of course other combinations of solids and liquids can be used. For example, sodium-iodide, a transparent solid having an index of refraction of 1.77 may be used with methylene-iodide liquid having an index of refraction of 1.74.

On the other hand, sodium chloride—a transparent solid with an index of refraction of 1.54 for yellow light— may be used with benzyl-alcohol, a liquid having the same index of refraction of 1.54 for yellow light. Using this combination of materials having the same quiescent indices of refraction, the optical cell would normally be transparent; and would become opaque when pressurized or de-pressurized.

Since the two above sodium compounds both tend to dissolve in water, these would not be suitable material for the container under conditions where water vapor is present.

It should be noted that the index of refraction of the liquid should be within pressure-range of the index of refraction of the solid; that is, the liquid must be such that the pressure is capable of changing the liquid's index of refraction to equal, or to differ from that of the solid. In those cases where no single liquid has a satisfactory index of refraction, it is possible to mix liquids having different indices of refraction, so that pressurization will cause the mixture of liquids to assume the same index of refraction as the solid.

It should also be noted that the term "transparent" refers to the transmission of a particular color, wavelength, or radiation of interest. For example, a particular optical cell designed for transparency to infrared or ultra-violet, may appear to be opaque to ordinary (visible) colors of light.

In the schematic arrangement shown in FIGURE 2, the pressure is applied by means of a plunger-like actuator, which may be moved mechanically or by means such as electro-magnet. Under some conditions, particularly where a fast shuttering action is desirable, it is extremely important that the pressure be applied and released practically instantaneously so that two steady-state conditions can be obtained.

An arrangement for achieving this result is shown in FIGURE 3. Here the basic optical-cell comprises two substantially-parallel windows 30A and 30B which may, if desired, be spaced apart by a resilient sealing material such as O-ring 32. The area between the O-ring 32 and the windows 30 is filled with the previously-described combination of transparent particles and liquid.

Quickly pressurizing and de-pressurizing the optical cell is achieved by means such as a piezoelectric element 34 that is preferably in the form of a round hollow tube. Electricity, applied to piezoelectric element 34 by means of lead-wires 36, activates the piezoelectric tube 34; and causes it to expand or contract longitudinally.

The expansion applies pressure to the optical cell as follows. The piezoelectric element 34 has one end abutting a clamping ring 38; and has its other end abutting a pressure-transmitting spacer 40 that transmits the pressure to window 30B of the optical cell. The other window 30A of the optical cell is fixedly-positioned, since it abuts another pressure-transmitting spacer 42 that in turn abuts a pressure surface 44, which is part of an overall tubular casing 46. Pressure-transmitting spacers 40 and 42 are preferably formed of a material such as Teflon, in order to protect the windows from being shattered under non-uniform pressure.

In operation, suitably-poled electricity is applied to lead wires 36 causing the piezoelectric element 34 to expand or to contract longitudinally.

The longitudinal change pressurizes or de-pressurizes the liquid in the optical cell, the liquid thereby changing its light-transmitting characteristics as previously described; so that light of a selected wavelength may pass through the optical cell, as shown by the arrows.

It is known that a piezoelectric element can expand very powerfully and very quickly to a desired extent. Therefore, by applying a suitabe pulse of electricity to the lead wires 36, the basic optical cell can be pressurized or de-pressurized in a very short period of time. If the quiescent optical cell is normally opaque to monochromatic light of a given wavelength, a sustained electrical signal may be made to activate the piezoelectric element to cause the optical cell to become and remain transparent to such wavelength.

Alternatively, a momentary electrical signal of suitable amplitude and duration will activate the piezoelectric element so that, for a selected wavelength of interest, the optical cell may go from opaque, to transparent, to opaque—thus providing a short-duration controllable interval of transparency for such selected wavelength.

Another mode of operation would be for the optical cell (of FIGURE 3) to be normally transparent to a selected wavelength; whereupon suitable activation of the piezoelectric element will cause the optical cell to become opaque to such wavelength for either a short or extended period of time.

Thus the arrangement of FIGURE 3 causes the optical cell to act as a fast-acting optical shutter to monochromatic light, or light of a selected wavelength.

It is to be further understood that by varying the electricals applied to the piezoelectric element, the center frequency of the narrow band pass optical filter of FIGURE 3 may be corresponding changed, whereby only a selected frequency of a polychromatic light source is transmitted.

It is known that when light impinges upon a wedge-like prism, the path of the light is bent; and the light emerges at an angle that depends upon the angle of the prism and its index of refraction.

Figure 4:
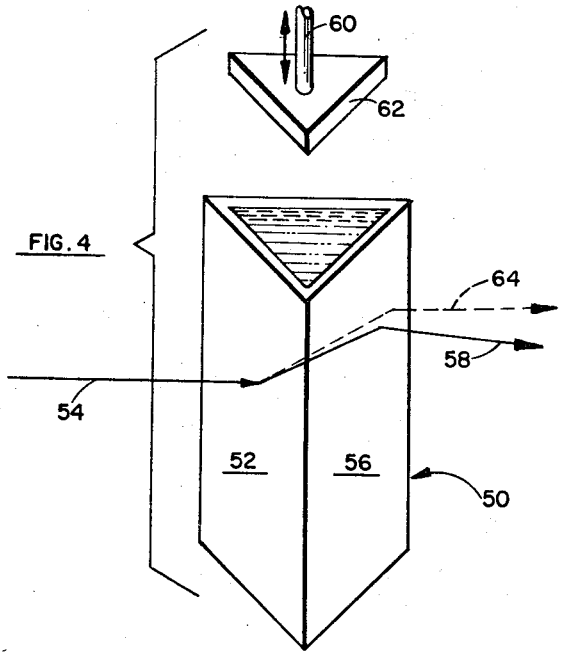
FIGURE 4 illustrates the inventive concept used as an optical scanner.

FIGURE 4 shows an exploded view of a wedge-like prism wherein the present inventive concept is used to provide an optical cell that produces optical scanning. In FIGURE 4, the optical cell comprises a hollow wedge-like prismatic container 50 having a light-input surface 52 and a light-output surface 54; these surfaces being mutually non-parallel or at an angle to each other. The optical cell is filled with a transparent liquid; and, as a result, the overall index of refraction of the optical cell depends—in part—upon the index of refraction of the liquid. Ordinarily, light impinging onto light-input surface 52 as shown by arrow 54, emerges from light-output surface 56, as shown by the solid-line arrow 58.

When the optical cell is pressurized to a steady-state condition, as for example by a mechanical, piezoelectric, or electro-mechanical plunger 60 pressing upon a resilient cover 62, the index of refraction of all portions of the liquid is changed to a different value—and thus the overall index of refraction of the optical cell is changed. Under this steady-state pressurized condition, the light emerges as shown by the dotted-line arrow 64.

It will be understood that intermediate steady-state pressurization of the optical cell will cause the light to emerge at angles that are intermediate between the angles indicated by arrows 58 and 64.

In this way, progressive steady-state pressurizing or de-pressurizing the optical-cell will cause a beam of light to scan over a given angular range; this scanning being achievable at a very high rate, determined by the rate at which the optical cell is pressurized and de-pressurized.

The present steady-state pressurized-liquid concept can also be used to produce a lens of variable focal length. Here the optical cell comprises a hollow lens shaped container that is filled with a transparent liquid. Normally, this optical cell has a given focal length, which is determined in part by the indices of refraction of the liquid and the container, and by the curvature of the surfaces of the optical cell. By steady-state pressurizing this optical cell, the overall index of refraction is changed; so that the optical cell would have a different focal length. In fact, suitably pressurizing this optical cell can cause it to act as a negative lens.

Although the invention has been illustrated and described in detail, it is to be clearly understood that the same is by way of illustration and example only, and is not to be taken by way of limitation; the spirit and scope of this invention being limited only by the terms of the appended claims.

I claim:

1. A pressure-sensitive optical cell comprising:
   a light transparent container adapted for interposition in in the path of a beam of light,
   a compressible fluid confined within said container and having a refractive index which varies over a range of values as a function of the pressure of said confined fluid, particles of a transparent incompressible material immersed in said fluid and within said beam of light and having a refractive index value lying within said range of values of the refractive index of said fluid, and control means coupled to said container for subjecting said fluid to a selected pressure.

2. The device of claim in which said control means co-operates to subject said fluid to alternative pressure states, one of which states produces an associated refractive index of said fluid corresponding to that of said incompressible material.

3. In a light energy translating system having means for generating a beam of monochromatic light, optical shutter means for gating said beam of light, comprising:

a light transparent container;

a transparent, compressible fluid confined within said container, said fluid having a refractive index which varies as a function of the pressure of said fluid, said fluid being interposed in the path of said beam of light;

particles of a transparent, incompressible material immersed in a said fluid and within said beam of light and having a refractive index lying within the range of values of the refractive index of said fluid; and control means coupled to said container for subjecting said fluid to alternative ones of mutually exclusive pressure-states, one of said pressure states providing an associated value of the refractive index of said fluid corresponding to that of said incompressible material for said monochromatic light.

4. In a light-energy translating system having means for generating a beam of polychromatic light, narrow band pass means for passing a selected spectral portion of said light, comprising:

a light transparent container;

a transparent, compressible fluid confined within said container, said fluid having a refractive index which varies as a function of the pressure of said fluid, said fluid being interposed in the path of said beam of light;

particles of a transparent, incompressible material immersed in a said fluid and within said beam of light and having a refractive index lying within the range of values of the refractive index of said fluid; and control means coupled to said container for subjecting said fluid to alternative ones of mutually exclusive pressure-states, one of said pressure states providing an associated value of the refractive index of said fluid corresponding to that of said incompressible material for a selected spectral portion of the spectra of said polychromatic light.

5. An optical cell comprising, in combination:

a rigid, hollow casing having apertures at opposite ends thereof, said apertures defining a light path through said casing, a pressure sensitive optical cell positioned within said casing in said light path, said optical cell comprising, first and second transparent windows mounted in said light path, a transparent liquid disposed between said windows, said liquid having the characteristic that that its index of refraction changes when said liquid is pressurized, a plurality of particles of a transparent solid disposed within said liquid, said particles and said liquid completely filling said cell, said particles and said liquid scattering an incident beam of light when there exists a difference in the index of refraction between said liquid and said particles, means for changing the pressure of said liquid to a value at which the index of refraction of said liquid is the same as that of said solid, said means comprising:

a piezoelectric element having an opening aligned with said apertures in said casing, said element being positioned within said casing, so as to move said first window with respect to said second window in response to an applied electrical signal, thereby altering the pressure of said liquid to change its index of refraction to equal that of said particles, and permitting a light beam to pass through said cell.

References Cited

UNITED STATES PATENTS

| 1,264,374 | 4/1918 | De Florez | 350—160 |
| 3,035,491 | 5/1962 | Rosenthal et al. | 350—161 |
| 3,257,903 | 6/1966 | Marks | 350—267 |

OTHER REFERENCES

Strong: Concepts of Classical Optics, W. H. Freeman and Co., San Francisco, 1958, pp. 583–585.

JEWELL H. PEDERSEN, *Primary Examiner.*

R. L. WIBERT, *Assistant Examiner.*

UNITED STATES PATENT OFFICE
CERTIFICATE OF CORRECTION

Patent No. 3,371,978                      March 5, 1968

Edwin Matovich

It is certified that error appears in the above identified patent and that said Letters Patent are hereby corrected as shown below:

Column 7, line 10, for "claim" read -- claim 1 --.

Signed and sealed this 15th day of July 1969.

(SEAL)
Attest:

Edward M. Fletcher, Jr.                      WILLIAM E. SCHUYLER, JR.
Attesting Officer                               Commissioner of Patents